United States Patent [19]

Wilks et al.

[11] 4,444,543
[45] Apr. 24, 1984

[54] WINDMILL

[75] Inventors: John E. Wilks, P.O. Box 929, Lebec, Calif. 92343; Jesse E. Hawley, Phoenix, Ariz.

[73] Assignee: John E. Wilks, Lebec, Calif.

[21] Appl. No.: 222,698

[22] Filed: Jan. 5, 1981

[51] Int. Cl.³ .................................................. F03D 11/04
[52] U.S. Cl. ................................. 416/170 R; 416/174
[58] Field of Search .......... 416/13, 12, 170 A, 196 A, 416/205, 9, DIG. 6, 174; 417/334

[56] References Cited

U.S. PATENT DOCUMENTS

| | | | |
|---|---|---|---|
| 372,563 | 11/1887 | Poe | 416/13 |
| 457,168 | 8/1891 | Sin Clair | 416/13 |
| 633,619 | 9/1899 | Smith | 416/13 |
| 837,795 | 12/1906 | Cassell | 416/13 |
| 1,359,605 | 11/1920 | Killough | 416/13 |
| 1,515,817 | 11/1924 | Somers | 416/13 |
| 1,755,422 | 4/1930 | Bucklen | 416/13 |
| 1,931,292 | 10/1933 | Knapp | 416/13 |
| 1,964,456 | 6/1934 | Davis | 416/13 |

FOREIGN PATENT DOCUMENTS 21163 of 1929 Australia ............................ 415/122

Primary Examiner—Philip R. Coe
Assistant Examiner—Frankie L. Stinson
Attorney, Agent, or Firm—Gregory J. Nelson

[57] ABSTRACT

A windmill having a gearbox, tail and wheel is disclosed in which a mast is secured to the windmill and is rotatable as a unit within a mast housing secured to the tower. A pull-out assembly exerts an axial downward force on a pull-out tube concentrically positioned within the mast. A mounting hub on the drive shaft supports the wheel at taper bearing surfaces. The individual sails are adjustably secured to one or more concentric, segmented rings attached to the mounting hub by radial spokes or braces.

5 Claims, 15 Drawing Figures

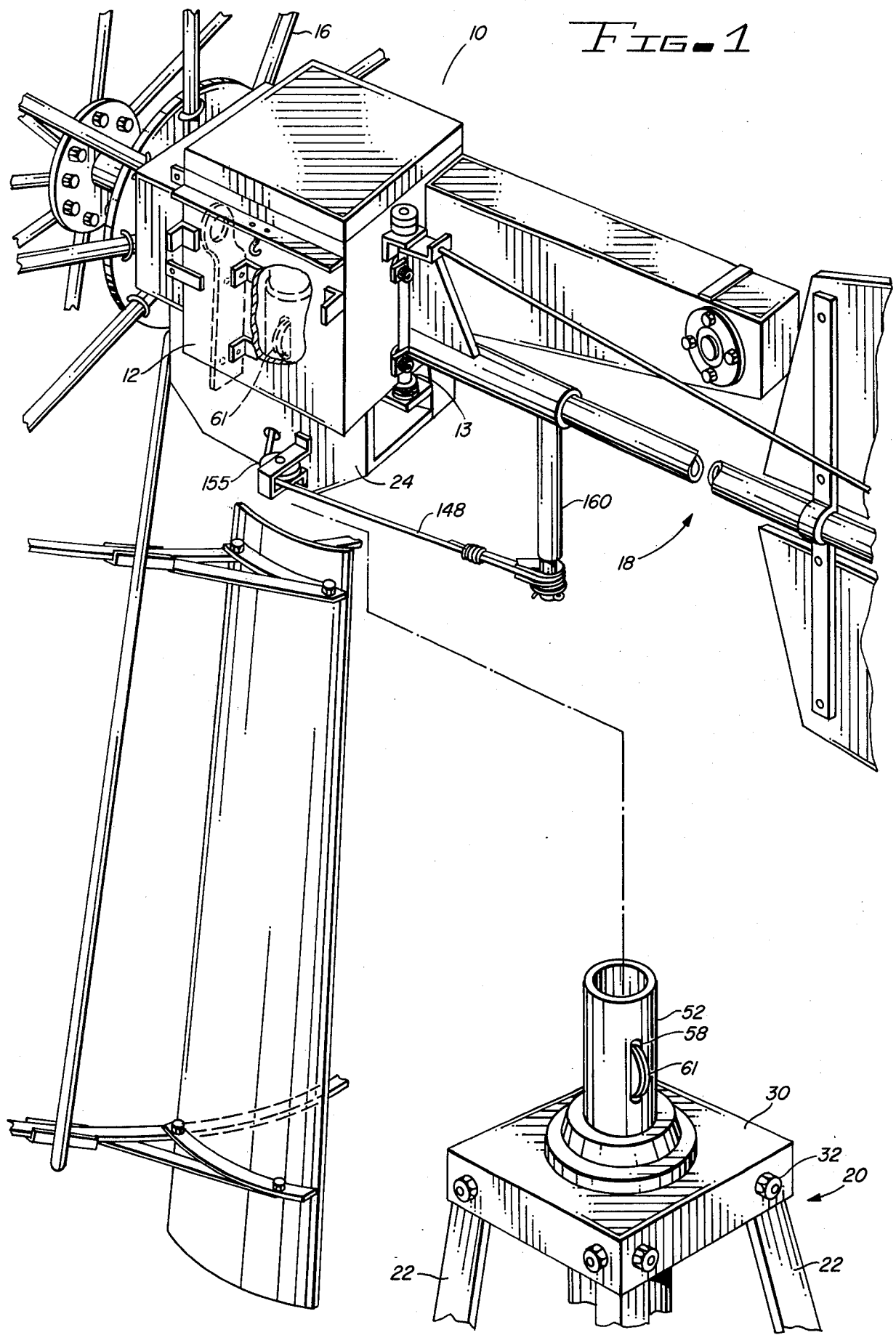

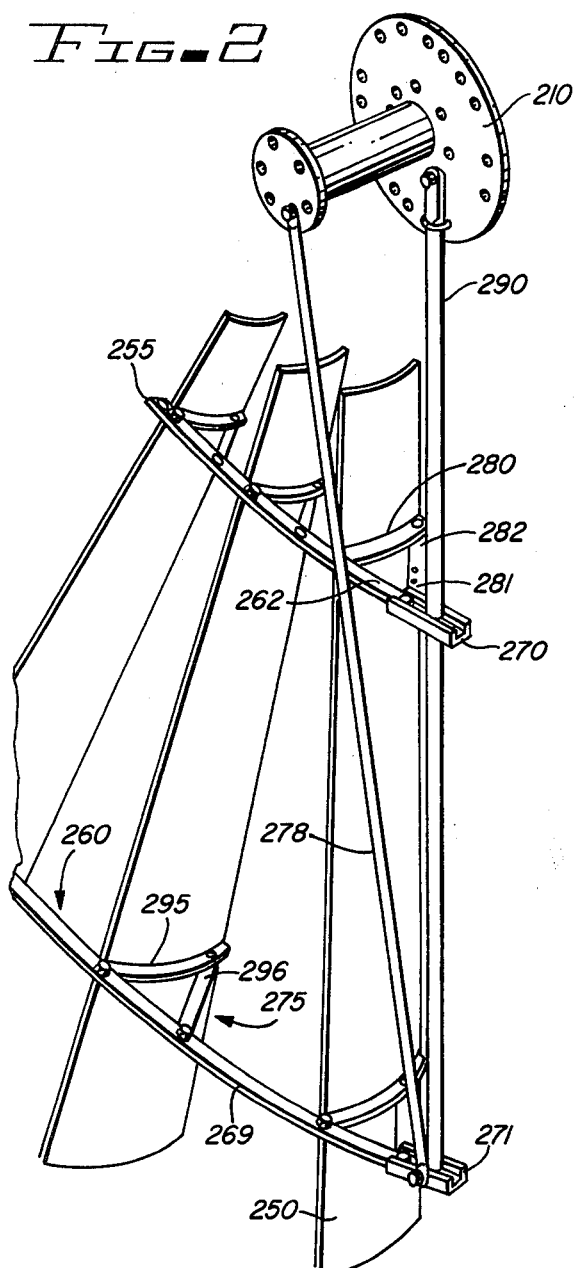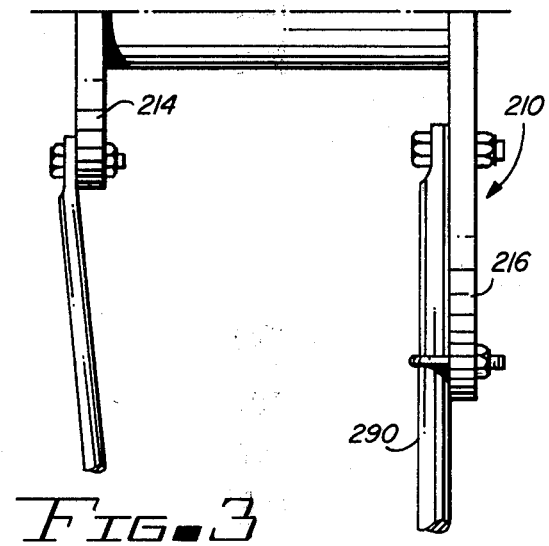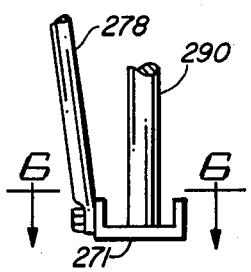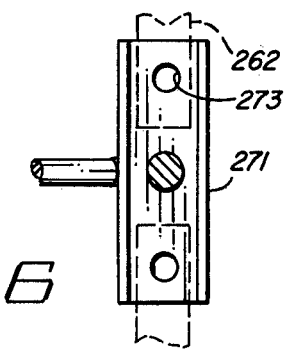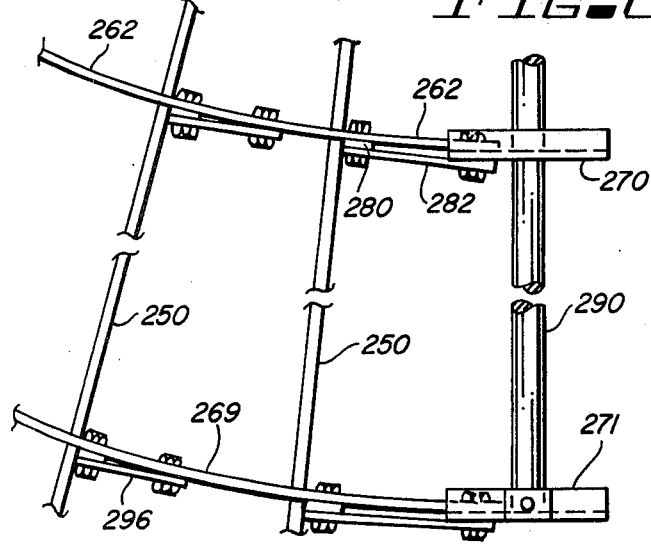

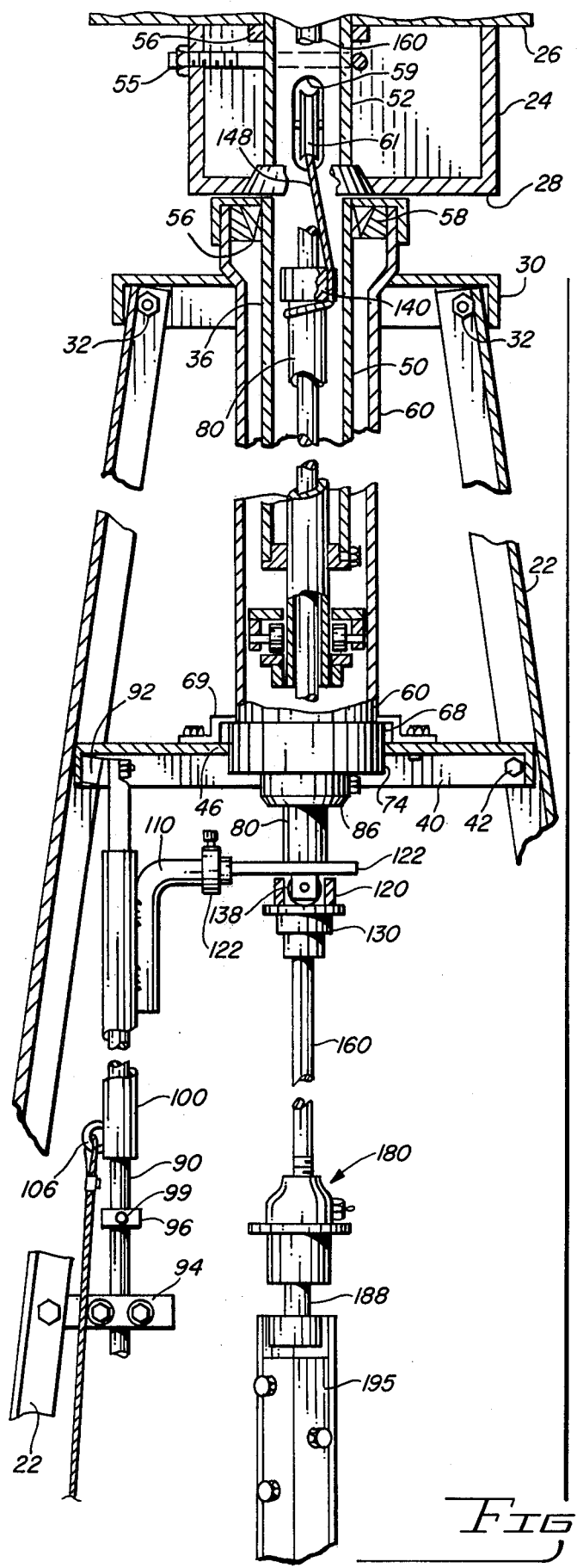
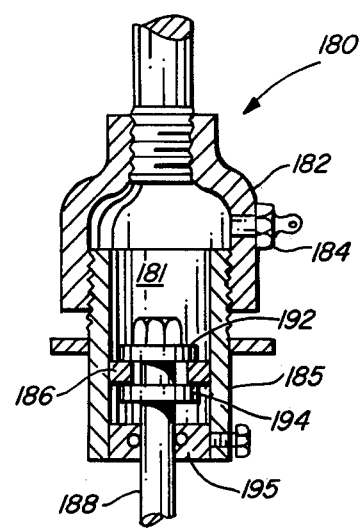
FIG-9
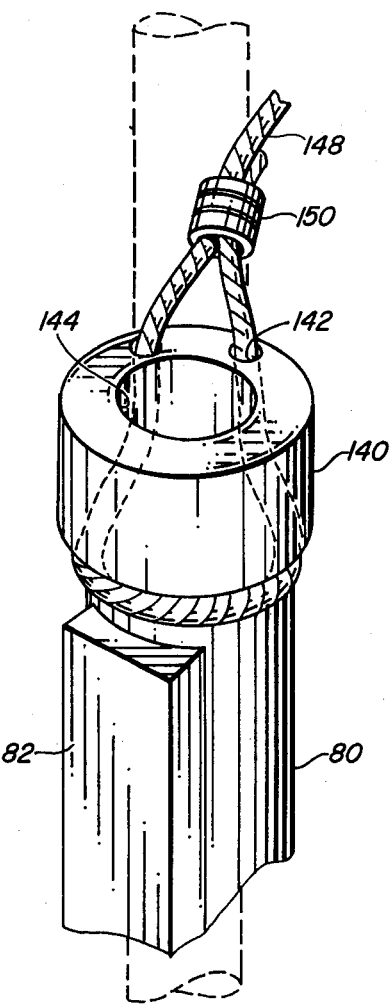
FIG-10
FIG-8

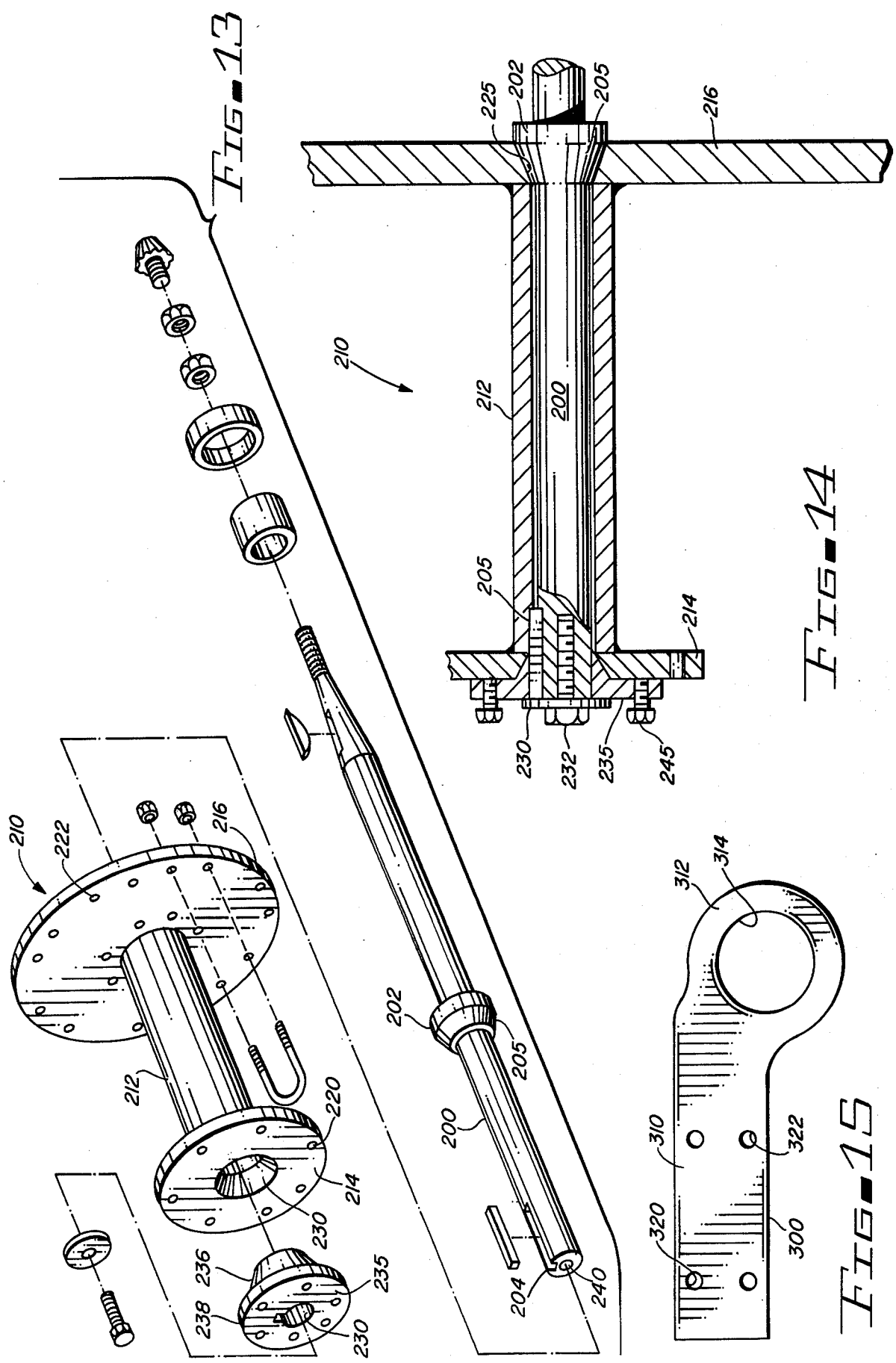

WINDMILL

The present application relates to improvements in a device for converting wind energy to mechanical energy and more particularly relates to improved windmill mechanism.

Daniel Halladay is generally recognized as the inventor of the modern windmill which is used extensively for pumping well water using wind energy. The basic Halladay design has undergone a few changes over the years, but the basic structure has remained essentially unchanged. A typical windmill system for pumping water includes a wheel, gearbox and tail assembly mounted on top of a tower, often termed the "top assembly". The wheel, which carries a number of vanes or sails, is connected to a gearbox which converts rotary motion into vertical motion for pumping. The tail is offset from the wheel shaft to allow the tail to fold parallel to the wheel in high wind conditions and effectively shut-down the mill and prevent destruction or damage due to high winds. A drive shaft, which is rotated by the wheel and connects to the gearbox, converts rotary motion into vertical motion for pumping. The vertical pumping motion reciprocates a plunger within a cylinder through a swivel, red rod, polished rod, packer head and well weal.

The conventional gearbox is typified by the back gear Baker run-in-oil windmill sold by the Heller Aller Company. As the wheel turns the main shaft, the train of the mechanism produces an up and down stroke of the pump rod through a gear and rocker arm arrangement, which is essentially a crank. Various other mechanisms for converting rotary motion into vertical motion for pumping can be found such as the transmission system described in the co-pending application of Jesse E. Hawley, entitled "WINDMILL", field Oct. 29, 1979, Ser. No. 089,557.

With the exception of the aforementioned co-pending application, windmill designs have gone substantially unchanged for many years. Windmills today embody essentially the same mechanical features that were utilized at the turn of the century. Briefly, it is an object of the present invention to provide a windmill design having an improved unitized mast arrangement for supporting the mill on the tower in which the mast is secured to the mill and is rotatable within a housing. The mill housing is secured to the tower. The present invention also provides a pull-out assembly for taking the mill out of the wind when desired. The improved pull-out applies forces parallel to the pump rod and eliminates application of transverse or lateral loads on the pump rod assembly. Further, the present invention also provides an improved mounting hub for securing and aligning the wheel on the drive shaft and a wheel design having an improved adjustable support assembly for the individual sails.

A more complete understanding of the present invention will be had from the following description, claims and drawings in which:

FIG. 1 is a partial perspective view of the mill and tower exploded for clarity;

FIG. 2 is a partial perspective view of a section of the wheel;

FIG. 3 is a partial side view of the wheel hub;

FIG. 4 is a side elevational view of the wheel;

FIG. 5 is an enlarged view as indicated in FIG. 4;

FIG. 6 is a sectional view taken along lines 6—6 of FIG. 5;

FIG. 7 is a partial front view of a section of the wheel;

FIG. 8 is a partial sectional view of the mast, tower and pull-out assembly;

FIG. 9 is a sectional view of the swivel connector between the pump rod and red rod;

FIG. 10 is a detail perspective view of the upper end of the pull-out tube;

FIG. 13 is an exploded view of the wheel hub;

FIG. 14 is a sectional view of the wheel hub shown in FIG. 13; and

FIG. 15 is a plan view of a lifting lug to be used with the present windmill;

Figure 11:
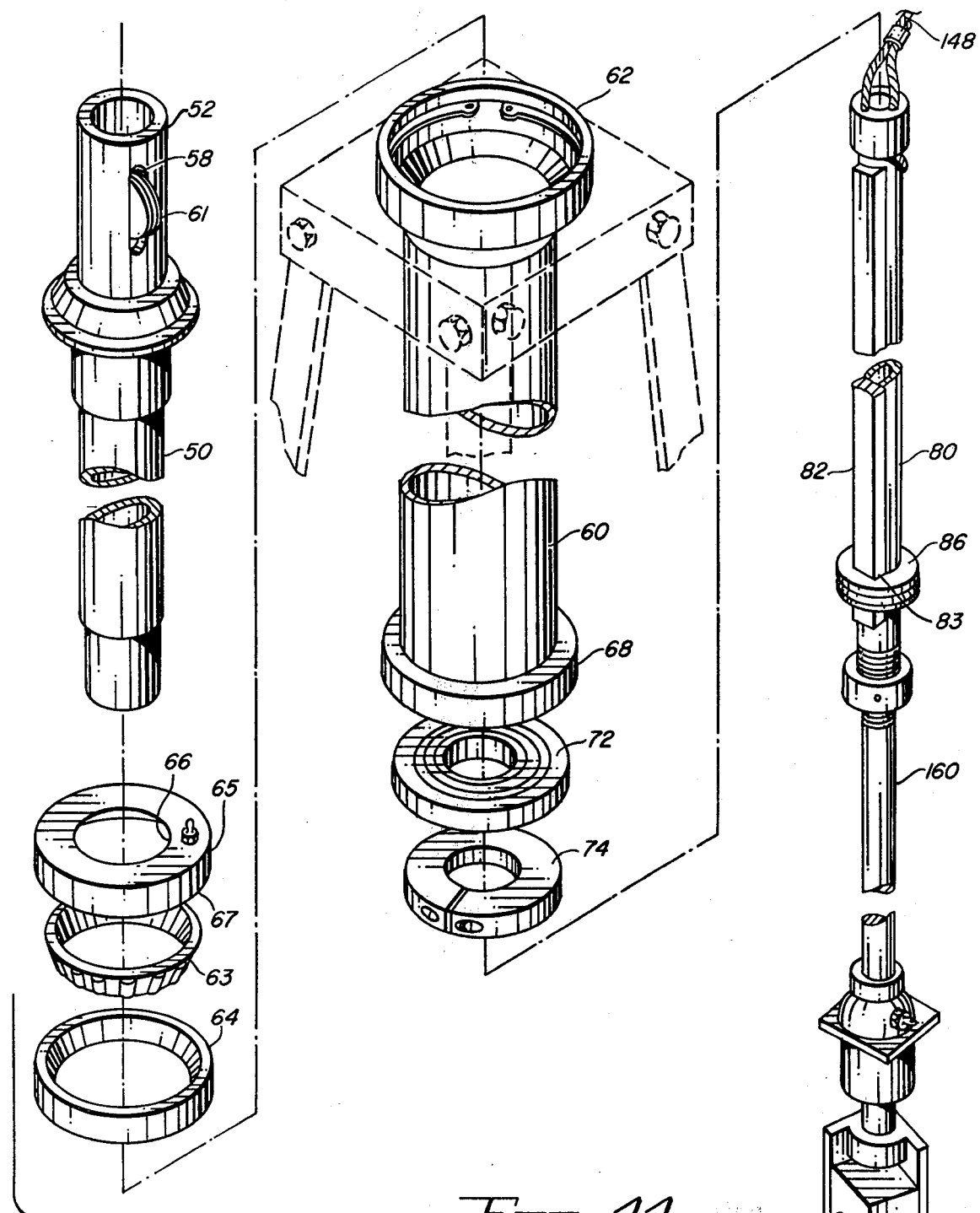
FIG. 11 is an exploded view of the mast and pull-out assembly.

Turning now to the drawings, FIG. 1 illustrates a windmill according to the present invention which is generally designated by the numeral 10. The term "mill" generally refers to the top assembly. Mill 10 includes a gearbox or transmission 12 for converting rotary motion into vertical motion for pumping. The transmission 12 may be conventional gearbox typified by the Baker run-in-oil windmill or may be of the improved design as set forth in co-pending application, Ser. No. 089,557. Wind energy causes the vaned wheel 16 to turn which imparts rotary motion to the input or drive shaft of the transmission 12. Tail mechanism 18 is pivotally secured to the transmission 12 at pivot 13 and as will be more fully explained hereafter, may be folded parallel to the wheel in high winds to effectively shut-down the mill and prevent its destruction in high wind conditions. The wheel, gearbox and tail, sometimes referred to collectively as the top assembly, are mounted on the top of a tower 20 supported on a plurality of vertical legs 22.

As best seen in FIGS. 1, 8 and 11, mill 10 includes a main frame 24 consisting of a box-like channel having a lower base plate 28. Housing or case 26 of transmission 12 is supported on channel frame 24. A cap 30 is provided at the top of the tower and is positioned horizontally being secured by bolts 32 or other mechanical fasteners to the upper end of the tower legs 22. Cap 30 is provided with concentric bore 36 to receive the mast pipe housing as will be more fully detailed hereafter. Vertically spaced below the tower cap 30 is a truing center 40 which is secured to the tower legs by bolts 42. Truing center 40 is similarly provided with a concentric bore 46 aligned with bore 36 in the tower cap.

As seen in FIGS. 8 and 11, the unitized mast assembly of the present invention includes a cylindrical mast pipe 50 having an upper end 52 extending into a socket 54 within the base 24. The upper end of the mast pipe is further secured to base 24 by an appropriate U-bolt 55, extending into the base. Tapered collar 56 extends annularly about the mast pipe 50 and is received within a mating taper hub 58 secured to the bottom plate 28 of the frame 24. A vertical slot 59 is provided in the upper end of the mast pipe 52 within the base 24. Pulley 61 is rotatably mounted in slot 59. The lower end of the mast pipe 50 terminates below the truing center and, as will be more apparent hereafter, the mast pipe and contained pull-out tube and pump rod rotate in unison with the top assembly.

Cylindrical mast housing 60 extends axially about the mast pipe 50. Housing 60 has an upper flange 62 which receives bearing members 63 and 64 to permit relative rotation between the internal mast pipe 50 and the housing 60. Cap 65 having concentric bore 66 is received over the mast pipe 50 and positioned immediately below taper 56 having an annular lip 67 which protects bearing components 63 and 64. Bearing component 63 and 64 are designed to accept both axial and radial loading imposed by the mill.

The lower end of housing 60 is provided with a flange 68 which extends through an opening in the truing center 40. Circumferentially spaced clamps 69 secure flange 68 to the truing center 40 to prevent rotation of the housing 60. A lower bearing 72 is interposed at lower flange 68 between housing 60 and the lower end of mast pipe 50. Bearing 72 absorbs primarily radial loads and is secured in place by collar 74 or mast pipe 50. It will be observed that the mast pipe 50 and the entire top assembly are rotatable as a unitized assembly within the mast housing 60. Bearings 63, 64 and 72 support the entire assembly for rotation absorbing axial and radial loads. The taper engagement of collar 56 and hub 58 on the bottom of the main frame 24 provide for accurate alignment of the entire assembly.

Referring to FIGS. 8 and 11, the pull-out assembly includes a generally elongate pull-out tube 80 concentrically positioned within the mast pipe 50. Pull-out rod 80 includes an axially extending key 82 which engages a keyway 83 in cap 86 in the end of the mast pipe 50. Thus, pull-out tube 80 rotates with the top assembly and the mast pipe.

As seen in FIG. 8, the pull-out assembly further includes a vertically oriented guide rod 90 which is secured to one of the legs 22 of the tower adjacent the lower end of the tube 80 at upper bracket 92 and lower bracket 94. An adjustable stop collar 96 is slideable along the guide rod 90 and may be secured at an appropriate location by set screw 99 to limit the downward travel of slide 100. Cylindrical slide 100 is vertically moveable along the guide rod 90 and is secured to cable 104 at eye 106. The lower end of cable 104 is secured to a lever or windlass, not shown, at ground level so that the mill may be pulled out of the wind when desired by pulling slide 100 downward. Arm 110 is welded or otherwise secured to the guide tube 100. Collar 120 is secured about the lower end of tube 80 and is attached to bracket 122. Bracket 122 is horizontally adjustable with respect to arm 110. Collar 120 can be accurately, concentrically positioned about the lower end of tube 80.

Threaded collar 130 is engaged about the lower end of tube 80 and a washer 132 is interposed between collars 130 and 120. Roller bearings 138 are secured to the interior of collar 120 in engagement with washer 132. Thus, tube 80 is mounted to freely rotate within the collar 120 which forms the lower portion of the pull-out assembly.

As seen in FIG. 10, the upper end of tube 80 is provided with a collar 140 having a pair of vertical bores 142 in the annular area offset from the axially extending opening 144. A flexible cable 148 is extended through holes 142 and is looped about the exterior of the tube 80 and secured at fastener 150. The opposite end of cable 148 extends about pulley 61 and about horizontal pulley 155 on base 24, as seen in FIG. 1, and is secured to arm 160 of the tail assembly.

Pump rod 160 extends axially within the bore 144 of tube 80. The upper end of pump rod 160 is secured to the transmission 12 and is reciprocally driven thereby.

The lower end of the pump rod is connected to swivel 180 as best shown in FIGS. 8 and 9. The swivel includes an upper bell housing 182 having a grease fitting 184. Bell housing 182 is in threaded engagement with cylindrical housing 184 having interior annular bearing surface 186. Shaft 188 which is connected to the upper end of the red rod 195 is provided with a pair of bearings 192 and 194 at opposite sides of annular bearing plate 186. The lower seal 195 serves to retain lubricant within the bearing chamber 181.

It will be observed that pump rod 160 is free to vertically reciprocate, driven by wheel 16 and transmission 12 which converts rotary motion into vertical motion for pumping. The lower end of the pump rod 160 is connected to the polished rod which, in turn, connects to the pumping cylinder in the well. The assembly including the top assembly and vertically extending mast pipe rotate as a unitary assembly with loads being absorbed at upper bearing 63 and 64 and lower bearing 72. The mast housing 60 is secured to the tower. The assembly described above facilitates installation of the unit on the tower and further insures accurate and precise alignment of all of the components for maximum efficiency and minimum wear.

When it is desired to pull the mill out of the wind, the throw-out lever or windlass, not shown, is actuated pulling the slide 100 downward. The downward motion of slide 100 is restricted by collar 96 which prevents undue stress from being imparted to the cable or pull-out mechanism. Further, since guide rod 90 is vertically oriented, all loads imposed are vertical and therefore parallel to the pump rod, tube and housing. The elimination of axial loads in the pull-out assembly is extremely important in preventing damage to the pumprod and pull-out tube.

Figure 12:
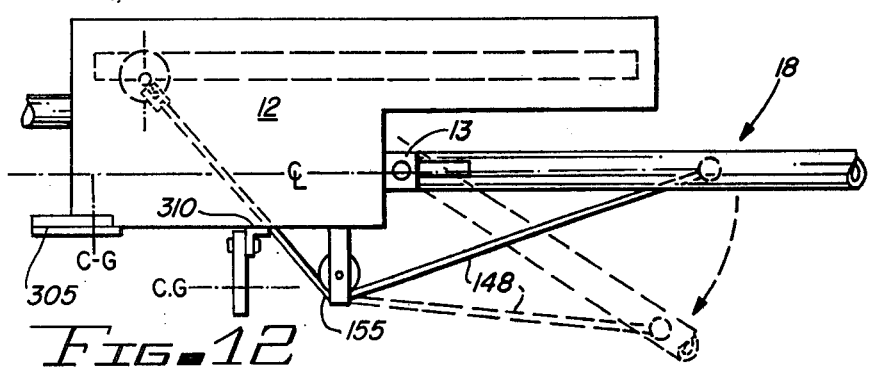
FIG. 12 is a plan view of the mill.

The downward movement of slide 100 is imparted to the tube 80 by collar 120 acting against washer 132 and lower collar 130 at the end of tube 80. As tube 80 is moved downward, cable 148 exerts a pull on the tail assembly 18 at arm 160 causing the tail 18 to fold at pivot 13 into position parallel to the wheel 16 as illustrated in FIG. 12.

Wheel 16 is shown in FIGS. 3 to 7, 13 and 14. Wheel shaft 200 is in driving engagement with transmission 12. Preferably, as mentioned above, transmission 12 is of the type disclosed in co-pending application Ser. No. 089,557 or may be of any other conventional type of gear arrangement for converting rotary motion of shaft 200 into reciprocal motion which is imparted to the pump rod 170. The wheel 16 is mounted on hub 120 carried on drive shaft 200. Wheel hub 210, as best seen in FIGS. 13 and 14, includes axial tube portion 212 carrying a front flange 214 and a larger rear flange 216. Flanges 214 and 216 are provided with peripheral holes 220 and 222 respectively for mounting the sail assembly as will be more fully explained hereafter. Rear collar 202 is secured to shaft 200 having an annular tapered surface 205. Tube 212 of hub 210 is provided with a mating taper 225 at rear flange 216. The forward end of shaft 200 is provided with a keyway 204.

Tapered surface 230 is provided at the forward end of tube 212 at flange 214. Taper lock collar 235 has a tapered portion 236 and is provided with a concentric bore 238 so that taper collar 235 may be placed about shaft 200 with taper surface 236 engaging taper 230 of the hub 210. Axial keyway 238 is aligned with keyway 204 in the hub with shaft 200 secured for common rotation by key 205. A washer 230 may be secured to the hub 235 by bolt 232 in engagement with threaded concentric bore 240 in shaft 200. One or more jack screws 245 may be annularly positioned about the flange of hub 235 to facilitate disassembly of the taper lock from the wheel hub.

It will thus be obvious that the wheel hub 210 is accurately positioned on the wheel shaft 200 as seen in FIG. 14. Substantially zero clearance is maintained with the wheel hub being entirely supported at the front and rear mating taper lock surface. Assembly in this manner eliminates holes, bores or other stress raisers in the wheel shaft 200, particularly in the area of taper collar 202 where maximum bending stress occurs. Further, assembly and disassembly of the wheel hub from the wheel shaft is facilitated and the wheel hub is self-aligning providing positive truing at the taper lock surfaces. Conventional securement of the wheel hub usually involves a spindle with a set screw arrangement which inherently creates stress and weakens the wheel shaft.

Referring to FIGS. 2 to 7, wheel 16 consists of a plurality of individual curved sails or vanes 250 bolted or otherwise secured to inner concentric ring 255 and outer concentric ring 260. Inner ring 255 is composed of a plurality of segments 262 which are secured together by U-shaped connectors 270 by appropriate bolts 273. The individual vanes or blades 250 are secured to the inner segmented ring by brace 280, generally having a curvature conforming to the curvature of the vanes. Brace 280 is secured at one end to the segment 262. The opposite end of brace 280 is secured to a riser 282 which has its opposite end bolted to ring segment 262. The length of riser 282 can be varied to change the pitch or weather angle of the blades. This can also be accomplished by providing a plurality of holes 281 in the riser which can be aligned with the mating hole in the ring section 262.

Radial support spokes or rods 290 secure rings 255 and 260 in place having their inner ends secured to the rear hub 216 and are appropriately welded or otherwise secured to the connectors 270 between the segments 262 of the inner ring.

As seen in FIGS. 2, 5 and 6, the outer ring 260 is similarly configured having a series of segments 269 secured by U-shaped connectors 271. Blades 250 are secured to ring 260 near their outer ends by a bracket and arm assembly 275 similar to that as has been described above having a curved brace 295 and attached riser 296. The ends of spokes 290 are welded or otherwise secured to connectors 271.

The wheel assembly is further reinforced by truss members 278 extending from the front hub 214 and secured at outer connectors 271. Thus, as best seen in FIG. 2, the completed wheel support assembly is bolted construction and therefore may be easily assembled or repaired. Further, the sail mounting assembly allows variation of the pitch or whether angle of the individual sails which to be easily accomplished by a mechanic. The wheel support assembly as seen in FIG. 2, further is in the form of a truss with concentricity established by the connectors on the various radially extending spokes.

Referring to FIG. 15, a lifting bracket, generally designated by the numeral 300 is shown. The purpose of a lifting bracket is to enable the mechanic to lift the transmission 12 with or without attached tail section 18 and wheel 16 from the tower in a balanced position. For this purpose, brackets 305 and 310 are provided at predetermined locations on the housing. Bracket 305 is located so that when the lifting bracket 300 is attached as shown in FIG. 12, the entire top assembly, including the wheel, tail and transmission can be lifted in a balanced position from the tower. In the event the tail and the wheel are first removed, bracket 300 can be removed and repositioned as alternately shown in FIG. 12 and lifted in a balanced position. Bracket 300 has an elongate body 310 and offset lug portion 312 having a lifting opening 314 for receipt of a lifting chain or cable. The offset is selected so the center of opening 314 can be aligned with the appropriate center of gravity in either of the bracket positions 305 or 310 at the respective bolt holes 320 and 325 as seen in FIG. 12.

From the foregoing, it will be seen that the present invention provides an improved windmill design which is engineered to facilitate installation, operation and maintenance of the mill. Adverse loadings are minimized to reduce friction and extend the life and improve the performance of the mill. The mill of the present invention can be utilized with the improved transmission of the co-pending application or with any conventional drive mechanism in which even the various components can be retrofit on existing installations.

It will be obvious to those skilled in the art to make various changes, modifications and alterations to the windmill design of the present invention. To the extent that those changes, modifications and alterations do not depart from the spirit and scope of the appended claims. They are intended to be encompassed therein.

We claim:

1. A unitized mounting assembly for a windmill, said windmill including a transmission on a turntable base, a tail and a rotatable wheel, said unitized assembly positioned on a tower having a cap and a subjacent truing center, said mounting assembly including:
    (a) a vertically extending mast pipe having an upper and lower end, said upper end being secured to said turntable base;
    (b) self-centering alignment means interposed between the upper end of said mast pipe and said base wherein said aligning means comprises a tapered collar about said mast pipe engageble in a cooperating socket on said tower cap;
    (c) a mast housing extending vertically about said mast pipe having an upper and lower end, said housing being secured to said tower;
    (d) first antifriction bearing means interposed between said mast housing and mast pipe adjacent said upper end of said mast housing to permit rotation of said mast pipe; and
    (e) second antifriction bearing means interposed between said mast housing and mast pipe at a location spaced apart from said first bearing means whereby said windmill and mast pipe are rotatable as a unit relative to said tower and mast housing and whereby said bearings absorb axial and radial loads, said first and second antifriction bearing means being independent of said self-centering alignment means.

2. The mounting assembly of claim 1 wherein the lower end of said housing is secured to the said truing center.

3. The mounting assembly of claim 1 further including a hollow pull-out tube axially extending within said mast, cable means extending between said tail and said pull-out tube, and means for reciprocating said tube to a pull-out position thereby pivoting said tail to an out-ot-the-wind position.

4. The mounting assembly of claim 1 further including a pump rod axially extending and reciprocable within said pull-out tube, said pump rod having a lower end connected to a red rod at a swivel joint.

5. The mounting assembly of claim 3 wherein said means for reciprocating said tube to a pull-out position includes:

(a) an axial guide rod disposed generally parallel to said tube;
(b) slide means slideable along said guide rod and connected to said tube; and
(c) bearing means interposed between said tube and slide means.

* * * * *